Patented May 24, 1949

2,470,955

UNITED STATES PATENT OFFICE 2,470,955

PROTEIN HYDROLYSATE CONTAINING ESSENTIAL AMINO ACIDS AND PROCESS FOR THE PREPARATION THEREOF

Melville Sahyun, St. Johns, Mich., assignor to Sterling Drug Inc., New York, N. Y., a corporation of New York No Drawing. Application June 3, 1948, Serial No. 30,972

15 Claims. (Cl. 195—29)

The present invention relates to the preparation of protein hydrolysates, and especially protein hydrolysates containing all of the essential amino acids. The hydrolysates are suitable for employment as and in amino acids compositions of value for parenteral administration and for therapeutic purposes. Such amino acids compositions are particularly useful in maintaining a nitrogen balance in the system of individuals undergoing surgical operations, in individuals who are unable to receive food orally, and in individuals suffering from malnutrition, and also especially useful in elevating serum proteins in individuals suffering from hypoproteinemia.

Protein is a component of every living cell, and an adequate supply of nitrogen is therefore a prerequisite for all living organisms. Protein molecules consist of a chemical combination of simpler molecules known as amino acids, each of the amino acids containing one or more nitrogen groups in one form or another which furnishes the organism with its selective nitrogen requirement.

The amino acids may be divided into two classes from a nutritional point of view, namely, the indispensable amino acids and the dispensable amino acids.

The indispensable amino acids may be defined, with respect to the requirements of the living animal, as those amino acids which must be present in the diet and cannot be synthesized by the body or replaced by other amino acids, at least not at a rate sufficient to meet the body's requirement. Their absence from the diet leads to eventual death. Lysine, tryptophane, histidine, phenylalanine, leucine, isoleucine, threonine, methionine, valine, and arginine are indispensable amino acids to most animals, and these, with the exception of arginine and histidine, are also indispensable to man.

The dispensable amino acids are often referred to as non-essential with respect to the requirements of the living animal. Their presence in the diet serves a useful purpose, yet one such amino acid may be substituted for another without any deleterious effect. As an example, glycine may be omitted entirely from the diet and its nitrogen equivalent may be derived from alanine. Glycine, alanine, serine, norleucine, aspartic acid, glutamic acid, hydroxyglutamic acid, proline, hydroxyproline, citrulline, tyrosine, and cystine are such dispensable or non-essential amino acids.

A solution of a mixture of amino acids which is to be used effectively for parenteral administration must contain all of the indispensable amino acids, and an adequate supply of the dispensable amino acids in order to provide the amino acid requirements of the patient.

In general, while most proteins cannot be administered parenterally in sufficient quantities for the purpose of supplying nitrogen requirements of a living organism, their constituents, the amino acids, can be safely injected provided that an adequate supply of all the indispensable amino acids is present in the solution to be administered; the solution of the amino acids has been properly prepared with respect to concentration, bearing in mind that many of the individual amino acids are highly insoluble and tend to come out of solution; the concentration of amino acids in solution has been adjusted so as to render them utilizable by the system with minimum loss through the kidneys; the acidity and tonicity of the solution is fairly well controlled; the solution is sterile and free from harmful bacteriocidal reagents and salts of heavy metals; and the solution is free from pyrogens, or the bodies of dead bacteria.

Three methods for obtaining amino acids from protein are known in the art. These methods are:

*Acid hydrolysis.*—This method consists in boiling the protein in the presence of a strong acid, such as sulfuric acid or hydrochloric acid, for a certain length of time. When this is done, the molecule of the protein is broken down into its respective constituents. Thus the hydrolysate consists of a mixture of amino acids in a strongly acid solution. While this procedure is excellent in many respects, the destruction of valuable amino acids such as tryptophane has always occurred concurrently with the hydrolysis. Tryptophane is an indispensable amino acid, and its absence from the mixture renders the product almost valueless for the purposes of maintaining nitrogen balance or for elevating serum proteins. Up to the time of the present invention, the destruction of tryptophane has always been regarded as an inherent characteristic of the acid hydrolysis of proteins.

*Alkaline hydrolysis.*—This method consists in boiling proteins in the presence of such strong alkalies as sodium hydroxide, potassium hydroxide, barium hydroxide, or the like. This method is unsatisfactory because of racemization of amino acids, many of which racemic forms are not utilizable by the animal system.

*Enzymatic hydrolysis.*—This type of hydrolysis would be ideal for the purposes of preparing a mixture of all of the essential amino acids, were it not for the fact that it has not yet been possible to obtain complete hydrolysis of proteins with any of the well known enzymes.

In order to have a suitable mixture of amino acids which is useful for clinical therapy, a more practical method for the preparation thereof is needed. Such a method should retain all of the indispensable amino acids in the final product; it should be practical and inexpensive; and, it should include a simple and convenient way for removing the reagent used in the hydrolysis, if such removal is necessary.

The method of the present invention fulfills these requirements and produces desirable and satisfactory products for the intended use.

It is an object of this invention to provide a novel process for the preparation of a protein hydrolysate containing all of the essential amino acids originally present in the starting protein material. Another object of the invention is to provide a method for the hydrolysis of protein material whereby the essential amino acid tryptophane is not destroyed, but whereby a high proportion of the naturally occurring l-tryptophane is retained. An additional object of the invention is the provision of a process for the hydrolysis of protein material which allows the production of an amino acids composition containing all of the essential amino acids including a high proportion of naturally occurring tryptophane, which is suitable for use in parenteral administration without the addition of tryptophane thereto. An additional object of the invention is to provide a method for obtaining such a mixture of amino acids which involves the fermentation of aldehydes and ketones of a carbohydrate nature in the starting protein material or in a partially hydrolyzed protein material, and subsequent acid hydrolysis of the protein or partial protein hydrolysate from which the objectionable aldehydes and ketones of carbohydrate nature have been eliminated. A further object of the invention is to provide a method for the hydrolysis of protein material which involves the steps of enzymatic hydrolysis, elimination of carbohydrates by fermentation, acid hydrolysis, and neutralization of excess acid, in the sequence given. Other objects of the invention will become apparent hereinafter.

It has previously been supposed that the destruction of tryptophane which always attended the acid hydrolysis of protein material was inherent in the use of an acid, and, being due to the acid, could not be avoided. For this reason, the dismutation of typtophane has been considered an undersirable but unavoidable result of acid hydrolysis. I have now found that the destruction of tryptophane during such acid hydrolysis is not due to the effect of the acid itself upon the tryptophane, but rather that aldehydes and ketones of a carbohydrate nature, such as glucose, fructose, lactose, galactose, pyruvic acid, or vitamin C, which may be present in protein or partially hydrolyzed protein material, are directly responsible for the dismutation of tryptophane during acid hydrolysis. By the discovery of the foregoing, the concept of the acid hydrolysis of protein material, and especially the effect of acid hydrolysis upon the amino acid tryptophane by or during such hydrolysis, must be entirely revised.

On a basis of this revolutionary finding, I am now able to start with a protein material containing all of the essential amino acids, partially hydrolyze the same, subject the partial hydrolysate to fermentation to destroy the aldehydes or ketones of a carbohydrate nature in the partial hydrolysate, and then continue the hydrolysis with acid to produce a mixture of all of the essential amino acids, the naturally occurring l-tryptophane in the starting protein material not being destroyed in the process. The fermentation step may also be applied prior to any hydrolysis, being in such case applied to the starting protein material itself. While the primary partial hydrolysis, when such sequence is employed, may be conducted in any suitable manner according to the art, this step is preferably accomplished with an enzyme, and, in the preferred manner of operation at an elevated temperature. After fermentation of carbohydrate material in the protein or partial protein hydrolysate, the secondary hydrolysis is conducted with acid, such acid treatment in the absence of carbohydrates having been found to have a minimum deleterious effect on the naturally occurring l-tryptophane in the mixture. The residual acid from the hydrolysis may be neutralized according to conventional procedure.

The method of the invention may be conducted according to either of the following procedures:

(a) Fermentation of carbohydrate materials in the starting protein material, followed by acid hydrolysis.

(b) Partial hydrolysis of starting protein material with acid, base, or preferably with an enzyme, followed by fermentation of carbohydrate materials in the partial hydrolysate and acid hydrolysis.

It is already known, as before stated, to hydrolyze protein material by the use of proteolytic enzymes. None of the essential amino acids of the starting protein material is known to be destroyed by this procedure, and enzymatic hydrolysis is therefore preferred as the method of primary partial hydrolysis, when such is employed. The present invention, in its preferred form, therefore consists in the enzymatic hydrolysis of a protein material containing all of the essential amino acids, preferably at a temperature between about 50 and about 75 degrees centigrade, fermentation of the partial hydrolysate to destroy aldehydes and ketones of a carbohydrate nature, hydrolysis with low acid concentration of the partial hydrolysate from which carbohydrate material has been eliminated, and neutralization of residual acid in the amino-acid mixture.

As the starting protein material, any known source of amino acids may be employed, such as casein, albumin, lactalbumin, liver protein, and so forth. Any of the usual materials known to be a source of all the essential amino acids may be employed, with casein being preferred on a basis of commercial availablity and ready adaption to the process of the present invention.

The incomplete hydrolysis of the starting protein material by proteolytic enzymes may be accomplished at about 37 degrees centigrade or preferably at higher temperatures, e. g., between about 50 and 60 degrees centigrade for trypsin, and 70 and 75 degrees centigrade for papain. The preferred range of temperature for the enzymatic hydrolysis is between about 50 and 75 degrees centigrade, as at these temperatures the rate of reaction is considerably faster so that the extent of hydrolysis possible enzymatically is accomplished within about 90 minutes to 120 minutes, or even up to three hours, whereas at a temperature of about 37 degrees centigrade the same extent of hydrolysis usually requires several days. By the employment of a higher temperature, therefore, the time period is considerably shortened, which is indeed desirable from a commercial standpoint. Moreover, at a higher temperature it is unnecessary to resort to preservatives such as chloroform and toluene, commonly employed in enzymatic hydrolysis at room temperature, and contamination and development of bacteria and pyrogens is thus completely obviated. The partial hydrolysis may be allowed to proceed, when conducted enzymatically, for as long a period as desired, and preferably up to the greatest extent of hydrolysis possible with the particular enzyme employed. Alternatively, the enzymatic hydrolysis may be conducted for a shorter period of time, but in such instances the advantages of the procedure become less pronounced. For most advantageous results, a substantial amount of enzymatic hydrolysis should be accomplished, e. g., 30 to 40 percent or even more extensive hydrolysis, and the time of digestion should be up to about two days at normal room temperature or, as stated above, from about 90 minutes to 120 minutes or somewhat longer for enzymatic digestion at the higher temperatures.

If desired, the partial hydrolysis, when such is employed, may be conducted using acid or basic hydrolysis instead of enzymatic hydrolysis. In such instances the final product will be less desirable inasmuch as the particular amino acids which are affected by or during these types of hydrolysis will of course be present in the final product in reduced quantities. Thus, if it is desired to retain in the final product all of the essential amino acids to the highest extent possible, it is necessary that the first step be conducted enzymatically. It is to be understood, however, that it is also within the purview of the present invention to include the use of either acids or bases in the step of partial hydrolysis. While the product in such cases does not contain all of the essential amino acids naturally occurring in the starting material, it is nevertheless retentive of considerably more of the amino acids which are usually destroyed if the procedure of the present invention is not employed. However, it will be obvious to one skilled in the art that, if, instead of enzymatic hydrolysis, a basic or acid hydrolysis is employed as the first step in the procedure, this should ordinarily be under mild conditions and with a weak concentration of acid or base, so that as much as possible of the desirable amino acid constituents of the starting protein material shall not be altered by the primary partial hydrolysis. Such primary hydrolysis should not generally exceed about 30—40 percent for accomplishment of useful results.

The fermentation step may be conducted according to any known manner for the fermentation of carbohydrates. The protein material or partial protein hydrolysate need only be retained at a temperature which is conducive to fermentation, as for example, at room temperature or above, and yeast or any equivalent thereof, which is preferably washed and in a substantially sterile condition, added to ferment the carbohydrates present. Any suitable amount may be used, e. g., up to about one-quarter pound of yeast per 100 pounds of starting protein material, which usually contains about one percent carbohydrates. The fermented protein or protein hydrolysate may then be filtered and introduced directly into the acid hydrolysis step of the process, or, alternatively, the removal of fermenting agent may be postponed to a later stage in the process, although this is not the preferred mode of operation. A partial hydrolysate ferment containing the yeast, after a sufficient period has been allowed for fermentation of carbohydrates in the mixture, is preferably adjusted to a pH in the acid range, usually to about 5.5, heated to an elevated temperature, e. g., about 80 to 100 degrees centigrade, treated with a filter aid, and then filtered. In this manner the aldehydes and ketones of a carbohydrate nature which are responsible for destruction or loss of tryptophane upon acid hydrolysis are removed from the protein or partial protein hydrolysate or inactivated by transformation to a substance which is non-reactive with the tryptophane as it is liberated from the protein material.

The final acid hydrolysis is conducted according to known procedure. Preferably an acid having a concentration of less than 1 normality is used, e. g., an inorganic acid such as hydrochloric or sulfuric acid of about 0.3 to 0.5 normality, or an inorganic acid such as lactic in a normality of about 0.5 or 0.6. When the preliminary step of hydrolysis by enzymes is included, such a secondary hydrolysis may be conveniently conducted under conditions of temperature and pressure such as can readily be obtained in a conventional autoclave. The temperature may be, for example, from about 212 to 260 degrees Fahrenheit and the pressure up to about 20 pounds per square inch. These conditions are generally satisfactory for attainment of a very desirable product. The time of autoclaving may vary somewhat, and may, for example, be from about 6 to about 10 hours, although longer periods may be used if desired. If up to 1.0 normal lactic acid is used in the acid hydrolysis, the final hydrolysate can be neutralized with sodium hydroxide, treated with activated carbon, filtered, and sterilized after adjusting it to its desired concentration. As the presence of sodium lactate is not harmful, this need not be removed from the composition. When no preliminary enzymatic or other hydrolysis is employed, other concentrations, preferably higher concentrations, of acids may be employed. Such may conveniently be up to about one normal or higher of the acids mentioned herein, the conditions of temperature and pressure remaining the same, but the reaction period varying up to about 24 hours.

The acid employed for the hydrolysis, either complete or secondary, is not particularly critical, as any organic or inorganic acid having a high pK or, otherwise expressed, a high index of hydrogen ion activity, can be used. Representative acids are sulfuric, phosphoric, hydrochloric, and lactic acids. Residual acid, if present after completion of hydrolysis, is of course neutralized, the final product being preferably brought to a pH between about 5.5 and about 6.0. Formation of an insoluble salt is the preferred method of neutralizing the product, as this allows ready separation of residual acid from the amino acid mixture. With sulfuric acid, residual acid may be removed as an insoluble salt, such as that of calcium, barium, or the like, the precipitate in such case being much less bulky than usual when a preliminary enzymatic hydrolysis is conducted prior to the fermentation and acid hydrolysis steps. When phosphoric acid is employed, residual acid may be removed as any salt which is non-toxic in the minute quantities which will exist in the composition after removal of excess acid therefrom. Hydrochloric acid, if used, may be removed by an ion exchange phenomenon. As previously stated, lactic acid may be merely neutralized with any suitable base, as 0.75 to 1.0 normality of lactate is not only harmless but useful upon administration to the human body. Similarly, any other organic or inorganic acid with a high hydrogen ion dissociation constant may be employed, provided that the acid may be removed from the final product as an insoluble salt, by an ion exchange reaction, or that the minor proportions of the acid which remain are harmless to the human body upon parenteral administration. Certain advantages attendant upon the employment of aqueous mineral acids, especially sulfuric acid, any excess of which can be readily removed by precipitation as barium sulfate, make the use of these acids, especially sulfuric acid, a preferred embodiment of the invention. Similarly, lactic acid is a preferred embodiment of the invention in the event that it is not desired to remove the residual acid. If the solution of amino acids is not desired to be used directly for parenteral administration, it is of course unnecessary that the above restrictions of acid concentration, neutralization, residual salt removal, and the like be adhered to, as these may be corrected by other suitable operations prior to employment of the mixture of amino acids in compositions for parenteral administration. However, when the final product is desired to be used directly for such purposes, it is necessary that these precautions be rigidly observed. The final mixture of amino acids, when enzymatic hydrolysis is employed as the first step of the process and is followed by fermentation and hydrolysis with acid of a concentration below about one normal, usually retains more than about 70 percent or even higher of the original amount of naturally occurring l-tryptophane present in the starting protein material.

While the amount of tryptophane which I am able to retain in the final amino acids product is certainly surprising, it having been previously believed that substantially all of the tryptophane was destroyed by acid hydrolysis, and while the amount retained by my new process is in most cases sufficient, it may in some cases be desirable to add a small amount of l- or isomeric tryptophane to the product prior to use for parenteral administration. This component may be added to the final hydrolysate together with other essential amino acids such as methionine, or the like, or any amino acids which are known to be present in the starting protein material in an amount inadequate for the intended purpose of the final product. Incorporation of small amounts of these amino acids into the final mixture in the desired proportions yields an amino acid mixture of excellent quality which is capable of producing a nitrogen balance in an animal system on a very low nitrogen intake per kilogram of body weight.

The final concentration of the mixture of amino acids obtained on secondary hydrolysis of the enzymatically predigested protein with sulfuric acid is adjusted to about 5 or 6 percent, as this concentration of amino acids lies within the tonicity range of blood. With the product obtained on secondary hydrolysis with lactic acid, the concentration is first adjusted to about 5 percent of amino acids and the corresponding lactate then produced by neutralization. In either case, the products are preferably filtered first through asbestos and then sterilized by cold sterilization.

Various modifications may be made in the method of the present invention, and it is to be understood that I limit myself only as defined in the appended claims.

I claim:

1. In a method for the preparation of an amino acids composition containing a relatively high proportion of the naturally-occurring tryptophane present in a protein material, the steps of fermenting carbohydrate material present in the protein material and then hydrolyzing the protein material with acid, to give an amino acids mixture which retains naturally-occurring tryptophane present in the protein material.

2. In a method for the preparation of an amino acids composition containing a relatively high proportion of the naturally-occurring tryptophane present in a starting protein material, the steps of partially hydrolyzing a protein material containing the essential amino acid tryptophane, fermenting carbohydrate material present in the partial hydrolysate, and continuing the hydrolysis with acid to give an amino acids mixture which retains naturally-occurring tryptophane originally present in the starting protein material.

3. In a method for the preparation of an amino acids composition containing a high proportion of the naturally-occurring tryptophane present in a starting protein material, the steps of hydrolyzing a protein material containing the essential amino acid tryptophane with a proteolytic enzyme, fermenting carbohydrate material present in the partial hydrolysate, and continuing the hydrolysis with acid to give an amino acids mixture which retains naturally-occurring l-tryptophane present in the starting protein material.

4. In a method for the preparation of an amino acids composition containing a high proportion of the naturally-occurring tryptophane present in the starting protein material, the steps of enzymatically hydrolyzing a protein material containing the essential amino acid tryptophane at an elevated temperature, fermenting carbohydrate material present in the partial hydrolysate, and continuing the hydrolysis with acid to give an amino acids mixture which is retentive of a high percentage of the naturally-occurring l-tryptophane present in the starting protein material.

5. In a method for the preparation of an amino acids composition containing a high proportion of the naturally-occurring tryptophane present in the starting protein material, the steps of enzymatically hydrolyzing a protein material containing the essential amino acid tryptophane at an elevated temperature between about 50 and about 75 degrees centigrade, fermenting carbohydrate material present in the partial hydrolysate, and continuing the hydrolysis with a weak concentration of acid to give an amino acids mixture which is retentive of a high percentage of the naturally-occurring l-tryptophane present in the starting protein material.

6. In a method for the preparation of an amino acids composition containing a high proportion of the naturally-occurring tryptophane present in the starting protein material, the steps of enzymatically hydrolyzing a protein material containing the essential amino acid tryptophane at an elevated temperature between about 50 and about 75 degrees centigrade, fermenting carbohydrate material present in the partial hydrolysate with yeast, continuing the hydrolysis with a weak concentration of acid, and neutralizing excess acid to give an amino acids mixture containing a high percentage of the naturally-occurring l-tryptophane present in the starting protein material.

7. In a method for the preparation of an amino acids composition containing a high proportion of the naturally-occurring tryptophane present in the starting protein material, the steps of enzymatically hydrolyzing a protein material containing the essential amino acid tryptophane at an elevated temperature between about 50 and about 75 degrees centigrade, fermenting carbohydrate material present in the partial hydrolysate with yeast, continuing the hydrolysis with weak acid having a normality less than about 1.0, and neutralizing the excess acid to give a mixture of amino acids containing a high percentage of the naturally-occurring l-tryptophane present in the starting protein material.

8. In a method for the preparation of an amino acids composition containing a high proportion of the naturally-occurring tryptophane present in the starting protein material, the steps of enzymatically digesting a protein material containing the essential amino acid tryptophane at an elevated temperature between about 50 and about 75 degrees centigrade, adding yeast and fermenting carbohydrate material present in the partial hydrolysate, adjusting the mixture to an acid pH, heating the mixture to a temperature up to about 100 degrees centigrade, filtering the insoluble material from solution, subjecting the filtrate to hydrolysis with an acid having a normality of less than about 1.0 for a time up to about ten hours, and neutralizing the excess acid to give an amino acids mixture retaining a high percentage of the naturally-occurring l-tryptophane present in the starting protein material.

9. The process according to claim 7, wherein the weak acid is an inorganic acid having a normality less than about 0.5.

10. The process according to claim 7, wherein the weak acid is sulfuric acid in a normality less than about 0.5, wherein excess acid is neutralized by addition of barium hydroxide, and wherein the precipitated barium sulfate is separated from the amino acids solution.

11. The process according to claim 7, wherein the weak acid is lactic acid in a normality up to about 1.0 and excess acid is neutralized with sodium hydroxide.

12. The process according to claim 7, wherein the weak acid is lactic acid in a normality of up to about 1.0 and the excess acid is neutralized with sodium hydroxide, treated with activated carbon, filtered, and sterilized.

13. A protein hydrolysate produced by the method of claim 1.

14. A protein hydrolysate produced by the method of claim 7.

15. A protein hydrolysate containing a high proportion of the naturally-occurring l-tryptophane produced by enzymatically hydrolyzing a protein source material containing the essential amino acid tryptophane up to at least about 30 percent hydrolysis, fermenting carbohydrate material present in the partial hydrolysate, removing insoluble material from solution, hydrolyzing the filtrate with an acid of a normality less than about one for a period from about six to ten hours, and neutralizing residual acid.

MELVILLE SAHYUN.

No references cited.